United States Patent
Reouveni et al.

(10) Patent No.: US 12,348,674 B2
(45) Date of Patent: Jul. 1, 2025

(54) SYSTEMS AND METHODS FOR THE ASYNCHRONOUS DETECTION OF ON HOLD TIME IN MULTI-CHANNEL CALLS

(71) Applicant: Outbound AI Inc., Seattle, WA (US)

(72) Inventors: Ronen Reouveni, San Diego, CA (US); Jonathan Wiggs, Seattle, WA (US); Robert Piro, Seattle, WA (US)

(73) Assignee: Outbound AI Inc., Seattle, WA (US)

( * ) Notice: Subject to any disclaimer, the term of this patent is extended or adjusted under 35 U.S.C. 154(b) by 149 days.

(21) Appl. No.: 18/142,756

(22) Filed: May 3, 2023

(65) Prior Publication Data
US 2023/0370546 A1 Nov. 16, 2023

Related U.S. Application Data

(60) Provisional application No. 63/340,103, filed on May 10, 2022.

(51) Int. Cl.
*H04M 3/493* (2006.01)
*H04M 3/428* (2006.01)

(52) U.S. Cl.
CPC ......... *H04M 3/493* (2013.01); *H04M 3/4283* (2013.01); *H04M 3/4286* (2013.01); *H04M 2201/40* (2013.01)

(58) Field of Classification Search
CPC .. H04M 3/5191; H04M 3/5175; H04M 3/493; H04M 3/4283; H04M 3/4286; H04M 2201/40; H04M 3/42221; H04M 2250/10; H04M 1/72409; H04M 1/23; H04M 1/6083; H04M 1/6091; H04M 1/66; H04M 2250/12
See application file for complete search history.

(56) References Cited

U.S. PATENT DOCUMENTS

| | | | | |
|---|---|---|---|---|
| 7,120,244 B2* | 10/2006 | Joseph | ............... | H04M 3/5238 379/265.14 |
| 7,684,556 B1* | 3/2010 | Jaiswal | ............... | H04M 3/5166 379/266.01 |
| 8,879,703 B1* | 11/2014 | Lavian | ................. | H04M 3/493 379/201.01 |
| 9,350,866 B1* | 5/2016 | Mekonnen | .............. | G10L 15/30 |
| 10,129,396 B1* | 11/2018 | Desai | .................. | H04M 3/5191 |
| 11,005,988 B1* | 5/2021 | Patakokila | .......... | H04M 3/4286 |
| 11,889,025 B1* | 1/2024 | Berger | ................. | H04M 3/428 |
| 2003/0083080 A1* | 5/2003 | Fournier | ............... | H04W 88/06 455/466 |
| 2005/0041796 A1* | 2/2005 | Joseph | ............... | H04M 3/5238 379/266.03 |

(Continued)

FOREIGN PATENT DOCUMENTS

| | | | | | |
|---|---|---|---|---|---|
| WO | WO-2016128790 A1 | * | 8/2016 | .......... | G06F 9/4443 |
| WO | WO-2020005260 A1 | * | 1/2020 | ............. | H04M 1/18 |

*Primary Examiner* — Akelaw Teshale
(74) *Attorney, Agent, or Firm* — FisherBroyles LLP; Alan D. Minsk

(57) ABSTRACT

Systems, devices, and methods for more effectively and accurately determining when a participant in a call or similar form of communications session that has placed their channel into an on-hold state ends the on-hold state, and the call or communication session returns to an active mode. In some embodiments, an on-hold state may be indicated by the playing of music and/or a message on the channel placed into that state.

20 Claims, 6 Drawing Sheets

(56) References Cited

U.S. PATENT DOCUMENTS

| | | | |
|---|---|---|---|
| 2010/0054450 A1* | 3/2010 | Southwick | H04M 3/5191 379/265.09 |
| 2010/0169156 A1* | 7/2010 | Gustafson | G06Q 30/0241 705/14.1 |
| 2018/0261238 A1* | 9/2018 | Togawa | H04M 3/5175 |
| 2021/0133780 A1* | 5/2021 | Adibi | H04M 3/5175 |
| 2022/0270020 A1* | 8/2022 | Matula | H04M 3/5141 |

* cited by examiner

SYSTEMS AND METHODS FOR THE ASYNCHRONOUS DETECTION OF ON HOLD TIME IN MULTI-CHANNEL CALLS

CROSS REFERENCE TO RELATED APPLICATION

This application claims the benefit of U.S. Provisional Application No. 63/340,103, filed May 10, 2022, and titled "Systems and Methods for the Asynchronous Detection of On Hold Time in Multi-Channel Calls", the contents of which is incorporated in its entirety (including the Appendix) by this reference.

BACKGROUND

In communications where audio is a component, such as telephony or conference calling, multiple audio channels are typically used. These channels are most often used to segment the audio for each participant. For instance, in a conventional person-to-person digital phone call there are two channels of audio, one channel for each speaker on the call. Larger conference calls or other telecommunication experiences may use tens or hundreds of audio channels to segment and isolate the audio for each participant.

During the length of an audio call there may be one or more times where the call is placed on hold (referred to as "hold times" or "on hold" times), meaning that person-to-person communication is suspended for a period of time while other tasks are performed by one or more of the participants. During the total length of a call the start and stop periods of these hold times is very difficult to predict and to detect.

When a call is placed into an "on hold" state by a participant, one or more of the audio channels are typically silent while the channel which placed the communication session on hold plays music, an automated message, or both. Because the channel placed on hold is not fully silent during an on-hold period, this further complicates the detection of these periods of time in which the participants are not actively communicating.

However, being able to automatically detect these periods of a call being in an on-hold state and when that state ends may be important for extracting metrics from a communications session and understanding certain performance analytics. An example of these metrics or analytics may include a total on hold time or the total time the participants of the call were exchanging information in a "live" exchange. Such metrics or analytics may have value in optimizing automated call systems and/or constructing more effective systems.

An attempt to automate an aspect of call processing by considering hold time data (for example, to automate at least some call management and routing functions based on information about an expected hold time length), would benefit from an ability to asynchronously detect these events. A reason for this is that by detecting them asynchronously, one could estimate the statistical distribution of the events. Further, the distribution could be partitioned into representative sections that contribute to the overall distribution and are based on the type or characteristics of a call.

This would be useful because a modeling approach to predict and enable automation of the handling of hold times would be aided by knowing the underlying distribution, particularly if the distribution could be separated into sections corresponding to different types of calls (such as marketing, requesting information, providing information, directed to a specific person or department, as non-limiting examples). As will be disclosed and/or described herein, by using call recordings as an input for the disclosed approach, one can begin to accurately estimate such a distribution.

A related concern is that of collision control. Assume that hold times can be reliably estimated and used to automate call handling, and that within a call center there occurs an attempt to start a call while a call center representative is currently on an active call. To avoid a "collision" (starting a new call and having a person answer the new call before a current call is completed), it would be helpful to know the distribution of hold times for a category of calls. Knowing this distribution would allow a system to suggest when in a current call, a call center employee should transition to the next call.

In one example implementation, a system would understand that a hold time would likely be "x" minutes while the current call likely has "y" minutes left. This data can be used to suggest when to place or accept another call, assuming a form of automated call processing based on hold time has been implemented.

A metric that may be extracted from analysis of hold time and its distribution is one useful in market and domain research. If a system understands how long a hold time is expected to be and the expected length of call, it could determine what proportion of a call can be automated. For example, if statistical findings allow for automating call processing using hold time data, one would also have determined the typical length of a hold time. This would allow a determination of the percentage of a call that could be automated, based on the type of call and the average hold time for that type of call. Furthermore, such metrics may have value in assessing the effectiveness of a group discussion, determining a response time to a caller's request for assistance, or evaluating the behavior of an interactive voice response (IVR) system, as non-limiting examples.

Embodiments of the disclosure overcome these and other disadvantages of conventional approaches, both collectively and individually.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

This disclosure is directed to systems, devices, and methods for more effectively and accurately determining when a participant in a call or similar form of communications session places their channel into an on-hold state and when that state is ended, and the call or communication session returns to an active mode (i.e., when a communication session that has been placed into an on-hold state returns to an active state). In some embodiments, an on-hold state may be indicated by the playing of music and/or a message on the channel placed into that state.

In one embodiment, the disclosed method may comprise one or more of the following steps, stages, processes, operations, or functions:
Selection of an audio communication channel for evaluation;
  Typically, this is only one channel, and is the one placed on hold and over which audio is detected;
    However, if audio is detected over more than one channel, then it may be the case that multiple channels have been placed on hold or into an inactive state, and for each such channel, the following process flow may be performed:
Determine a timestamp for the first detected word spoken in the channel;
  Typically, audio containing speech is converted into text using an automatic speech recognition (ASR) system. These are models available online that have a semi-standard mode of interaction;
    As may be inferred, in some embodiments, the audio content is first converted to text prior to performing the other process steps, such as the counting of syllables;
  Note that the disclosed approach is expected to be agnostic to ASR variability in word prediction accuracy. This is because the disclosed system does not rely on key words and instead only upon syllables; as a result, it is able to make accurate predictions for the end of a hold time period in the presence of (relatively) poorly predicted or identified words;
    For example, the "correct" word may be "service", but an ASR predicted the word "nervous". This could have a significant impact on applications involving natural language processing or understanding, but would have a minimal (if any) impact on the disclosed system's ability to locate the end of a hold time period;
  To account for a nonverbal audio input to the ASR, the disclosed system can be adapted to filter out noise. Since noise is almost always picked up as a single syllable "word", the variations in interval times that result are generally not enough to have a significant impact on determining hold-times or the end of an on-hold period;
    This suggests that logic could be implemented to automatically remove single syllable "words" in the text obtained from audio from further use in processing, specifically if the duration of a word is shorter than logically possible, in which case the anomaly would be removed;
Set this time (the timestamp for the first detected word) as an initial value for a time interval during which the disclosed evaluation will be performed;
Set or select a length of the time interval, and based on the length, set a final value of the time interval;
  In one embodiment, the final value or end of the time interval may be determined by adding a constant value (the length expressed as "x" seconds) to the initial value;
    Selection of an appropriate interval length is related to the threshold value (discussed in greater detail below), which may be chosen or determined by other means; too small a phrase length for processing and the process will be overly sensitive to short phrases in response to an interactive voice response system (for example). Similarly, too long a time interval for processing and the process may become insensitive and not sufficiently reliable. In some cases, the appropriate or optimal time interval may be found through a "trial and error" process;
    The optimal time interval may be domain specific and based on the type of interaction a user has with the IVR. Some IVR systems require longer responses while others work with briefer responses. The interval can be calibrated to the domain and then is expected to perform with reliable accuracy;
  In some embodiments, the time interval may be determined by a ruleset, model, evaluation of historical data, or heuristic; if a ruleset is used, then it may be data driven. In general, it is desirable for the interval to be independent of channel, because the system is preferably agnostic to the speaker and/or the channel they are using;
    When devising a ruleset or other form of decision logic (such as a trained model or predictive process) to determine the time interval, the domain should be considered. For example, a call center may have a portfolio of contacts it interacts with regularly, Each of these different contacts each have a unique IVR system. The responses to such systems differ due to the prompts incorporated into the IVR systems. A ruleset can be developed to determine a custom interval based on the portfolio of contacts. Contacts who utilize an IVR that requires shorter responses can have a different time interval setting than contacts who utilize an IVR with longer responses;
  Some IVR systems may require those interacting with it to respond with dictation, for example, by presenting a long identifier or credit card number. In these systems, it may be beneficial to ignore the syllables in back-to-back one letter words (which is another example of logic that could be implemented to conditionally ignore or remove certain values);
    In one embodiment, the disclosed system can be configured to ignore syllables from groups of words that resemble the dictation of a unique sequence, such as an ID or credit card number. If the system encounters back-to-back words each of length 1 syllable, then it can be instructed or configured to ignore these in the syllable count that is part of the disclosed processing flow;
For each word in the defined time interval, count the number of syllables spoken over the selected channel;
  Note that for most use cases, it is preferable that the disclosed approach operate the same regardless of whether the speaker is a human or a machine-generated voice;
Compare the number of syllables spoken over the selected channel during the defined time interval to a threshold value;
  Where in one embodiment, the threshold value may be determined by analysis of the aggregate past behavior of (or on) the relevant channel. Typically (although it is not required for all use cases), the disclosed system or process does not update the threshold or the time interval based on the current conversation or communication session;

If such prior behavior is not known, then the disclosed system or process may set an initial or default value using the following approach that could be applied across domains:
  Graph the number of syllables every 5 seconds along an entire audio stream (with time on the x axis and syllables during that time window on the y axis, as in FIG. 1(a));
  Visually look for separability (as seen in FIG. 1(a));
  Set the visually depicted separation as the initial value;
  Refine its value along with the time value on the x axis;
  Repeat across additional audio streams to determine if the same separability exists; and
  Test and validate across additional audio streams to obtain a generalized threshold value;
If the number of syllables spoken during the defined time interval exceeds the threshold value, then determine/decide that an on-hold period/state has ended;
If the number of syllables spoken during the defined time interval does not exceed the threshold value, then
  Go to the step or stage "Determine a timestamp for the first detected word spoken in the channel" above and continue by detecting a next word;
    Repeat the disclosed processing flow until the number of syllables spoken during a defined time interval exceeds the threshold value;
After determining that an on-hold period or state has ended, continue or return to the process interrupted by the placement of the channel into the on-hold state. Examples of an interrupted process may include, but are not limited to;
Conference Call;
Lecture; or
IVR Navigation and Response processing.

In some use cases, an on-hold period or state may not end; for example, people may get frustrated and hang-up, thereby terminating a call or session. In such a situation, if after iterating over each word and its corresponding syllables during a defined interval, an end to the on-hold state is not detected, then the process returns to the step of "Determine timestamp for first detected word spoken in the channel" until the process flow has no further words to process. As indicated, the disclosed processing flow can end in one of two ways; either it detects the end of the on-hold state, or it processes all of the defined time intervals and returns a result that no end of the on-hold state was found.

In one embodiment, the disclosure is directed to a system for more effectively and accurately determining when a participant in a call or similar form of communications session places their channel into an on-hold state and when that state is ended (i.e., when a communication session that has been placed into an on-hold state returns to an active state). The system may include a set of computer-executable instructions and one or more electronic processors or co-processors. When executed by the processors or co-processors, the instructions cause the processors or co-processors (or a system or device of which they are part) to perform a set of operations that implement an embodiment of the disclosed method or methods.

In one embodiment, the disclosure is directed to one or more non-transitory computer-readable media that include a set of computer-executable instructions, wherein when the set of instructions are executed by one or more electronic processors or co-processors, the processors or co-processors (or a system or device of which they are part) perform a set of operations that implement an embodiment of the disclosed method or methods.

Other objects and advantages of the disclosed systems and methods will be apparent to one of ordinary skill in the art upon review of the detailed description and the included figures. Throughout the drawings, identical reference characters and descriptions indicate similar, but not necessarily identical, elements. While the exemplary embodiments disclosed and/or described herein are susceptible to various modifications and alternative forms, specific embodiments have been shown by way of example in the drawings and will be described in detail herein. However, the exemplary embodiments disclosed and/or described herein are not intended to be limited to the forms described. Rather, the present disclosure covers all modifications, equivalents, and alternatives falling within the scope of the appended claims.

BRIEF DESCRIPTION OF THE DRAWINGS

Embodiments of the disclosed system and methods are described with reference to the drawings, in which.

Note that the same numbers are used throughout the disclosure and figures to reference like components and features.

DETAILED DESCRIPTION

Figure 1A:
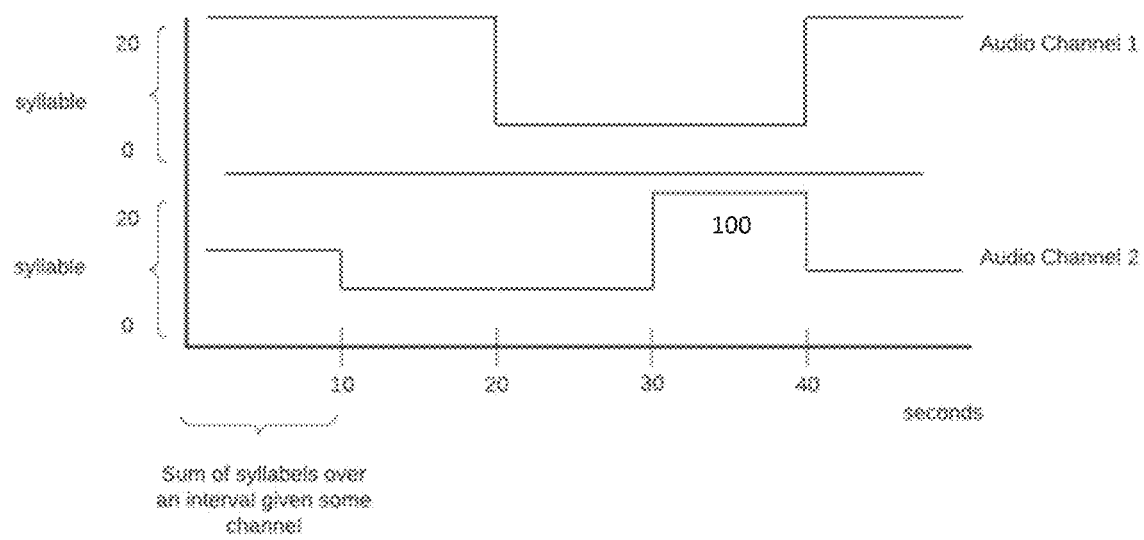
FIG. 1(a) is a diagram illustrating an example of how the number of syllables spoken during a time interval varies during a communication session, and illustrates an example of the processing that may be performed on an audio waveform as part of implementing an embodiment.

The subject matter of embodiments of the disclosure is described herein with specificity to meet statutory requirements, but this description does not limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure are described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods disclosed and/or described herein may be implemented by one or more suitable processing elements (such as a processor, microprocessor, CPU, GPU, TPU, or controller, as non-limiting examples) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements (such as computer-readable media). In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, the systems and methods disclosed herein may be provided (in whole or in part) through a SaaS or multi-tenant platform. The platform provides access to multiple entities, each with a separate account and associated data storage. Each account may correspond to a communication session, a user, a set of users, or an organization, for example. Each account may access one or more services, a set of which are instantiated in their account, and which implement one or more of the methods or functions disclosed and/or described herein.

In some embodiments, one or more of the operations, functions, processes, or methods disclosed and/or described herein may be implemented by a specialized form of hardware, such as a programmable gate array or application specific integrated circuit (ASIC). An embodiment of the disclosed and/or described methods may be implemented in the form of an application, a sub-routine that is part of a larger application, a "plug-in", an extension to the functionality of a data processing system or platform, or other suitable form. The following detailed description is, therefore, not to be taken in a limiting sense.

In the context of the disclosed systems and methods, the following terms are understood to have at least the following meanings:

Active Communication—One channel is interacting with another channel. This can exist in the form of a human interacting with another human or an interaction between a human and a machine (such as an IVR system);

On Hold—Given a call or communication session has been initiated, this describes a situation where one channel is placed in a state of waiting to interact with another channel. Typically, either a human is waiting to speak with another human or waiting to interact with a machine-implemented process flow;

Call—a telecommunication session between two or more parties;

Word—a single distinct (and typically meaningful) element of speech. Usually consists of one or more syllables;

Syllable—a unit of pronunciation having one vowel sound, with or without surrounding consonants, and forming the whole or a part of a word.

In one embodiment, to enable determination of when a communication channel being used for an audio transmission that has been placed in an on-hold state is removed from the on-hold state and hence is active), the disclosed system may determine the number of syllables spoken on an audio channel over a given time interval. This number can then be compared to a configurable threshold. In some embodiments, the number of syllables spoken may also (or instead) be individually monitored for each channel and a decision made based on the individual channel or an individually set threshold value (such as one based on a channel's historical characteristics, context, or the current use environment).

Among other advantages, a benefit of the disclosed approach is that it allows the system to ignore unnecessary speech on an irrelevant channel. It also enables the system to ignore short response phrases on the relevant channel. By monitoring the syllables communicated and not the words, the disclosed approach can control for elements such as word length.

FIG. 1(a) is a diagram illustrating an example of how the number of syllables spoken during a time interval varies during a communication session and illustrates an example of the processing that may be performed on an audio waveform as part of implementing an embodiment. Specifically, FIG. 1(a) illustrates how the number of syllables spoken per 10 second interval varies during a communication session. As an example, a threshold condition could be that if 20 syllables are spoken within 10 seconds, then it is interpreted as an end to an on-hold period. In this case, if audio channel 2 is considered as the relevant channel, then the system would select the interval beginning at 30 seconds (indicated as section 100) as the end of an on-hold period. Notice that the system does not detect the end of an on-hold period when channel 1 is above an amount of 20 syllables uttered in 10 seconds. This is because the disclosed approach includes an ability to ignore that channel. In this example, it may be that the presence of speech on that channel is either music or an advertisement that is not an example of human speech.

Each word spoken on a given telecommunication channel has an associated timestamp. That is, each word in a sequence of words contains a timestamp denoting its location in the sequence. In some embodiments, the disclosed method iterates over the sequence of timestamps to evaluate the presence or absence of an on-hold period.

The initial timestamp in a sequence is termed timestamp "i", and to this value, "x" seconds are added (where "x" is the length of a time interval used for the evaluation, and may be determined by historical behavior, a default value, a rule, or a trained model, as non-limiting examples). This provides two timestamp values, one representing a lower bound and a second representing an upper bound. The upper bound is "x" seconds above the lower bound, while the lower bound is the current timestamp in the sequence being evaluated.

In some embodiments, the disclosed method iterates over all the words within an interval and computes a sum of the count of syllables that appear within the interval. If more than a threshold number (e.g., "z") of syllables occur within the defined time interval or timestamp range, then the method denotes/indicates that the on-hold period has ended. If less than the threshold number of syllables occur within the time interval, then the method increments to the next timestamp in the sequence.

This pattern or processing flow is repeated to generate a new range where the lower bound is the next timestamp, in this case "i+1", and the upper bound is "x" seconds above that timestamp. The method again determines if a threshold number of syllables occur in this interval by summing the syllables that occur within the words that appear between the bounds of the time interval. This process is repeated until the threshold condition is satisfied. Otherwise, the method concludes that the on-hold period has not expired.

Figure 1B:
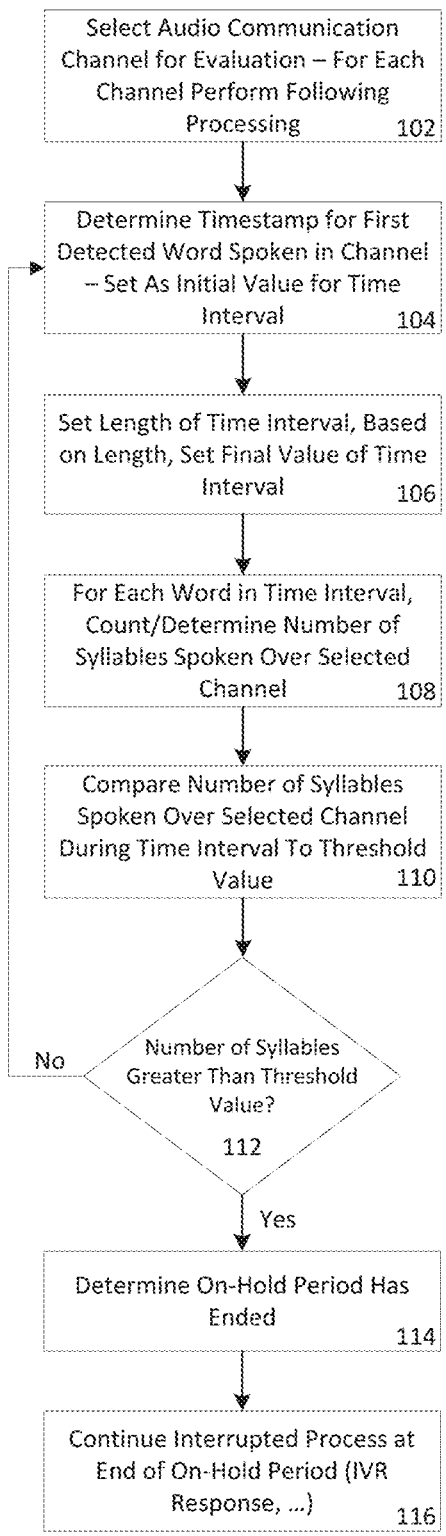
FIG. 1(b) is a flow chart or flow diagram illustrating a method, process, operation, or set of functions that may be used in implementing an embodiment of the disclosure.

FIG. 1(b) is a flow chart or flow diagram illustrating a method, process, operation, or set of functions that may be used in implementing an embodiment of the disclosure. The set of steps or stages illustrated in FIG. 1(b) represent an example of a process for determining if (or when) an audio channel that was placed into an on-hold state is removed from that state, or in other words, that an on-hold period has ended and the communication session is "active".

In one embodiment, the disclosed method may comprise one or more of the following steps, stages, processes, operations, or functions:

Selection of an audio communication channel for evaluation (as suggested by step or stage 102);
  Typically, this is only one channel, the one placed on hold and over which audio is detected;
    However, if audio is detected over more than one channel, then it may be the case that multiple channels have been placed on hold or into an inactive state, and for each such channel, the following process flow may be performed:
Determine a timestamp for the first detected word spoken in the channel (as suggested by step or stage 104);
  Set this time as an initial value for a time interval during which the disclosed evaluation will be performed;
Set or select a length of the time interval, and based on the length, set a final value of the time interval (as suggested by step or stage 106);
  Selection of an appropriate interval length is related to the threshold value (discussed in greater detail below), which may be chosen or determined by other means; too small a phrase length for processing and the process will be overly sensitive to short phrases in response to an interactive voice response system (for example). Similarly, too long a time interval for processing and the process may become insensitive and not sufficiently reliable. In some cases, the appropriate or optimal time interval may be found through a "trial and error" process;
    The optimal time interval may be domain specific and based on the type of interaction a user has with an interactive voice response (IVR) system. Some IVR systems require longer responses while others work with briefer responses. The interval can be calibrated/adjusted to the domain and then is expected to perform with reliable accuracy;
  In some embodiments, the time interval may be determined by a ruleset, model, or heuristic; if a ruleset is used, then it may be data driven based on historical data or other characteristic(s) of a domain or communication channel. In general, it is desirable for the interval to be independent of channel, because the system is preferably agnostic to the speaker and/or the channel they are using;
    When devising a ruleset or other form of decision logic (such as a trained model or predictive process) to determine the appropriate time interval, the domain may be considered. For example, a call center may have a portfolio of contacts it interacts with regularly. Each of these different contacts have a unique IVR system. The responses to such systems differ due to the prompts incorporated into the IVR systems. A ruleset can be developed to determine a custom interval based on the portfolio of contacts. Contacts who utilize an IVR that requires shorter responses can have a different time interval setting than contacts who utilize an IVR with longer responses;
  Some IVR systems may require those interacting with it to respond with dictation, for example, by presenting an identifier or credit card number. In these systems, it may be beneficial to ignore the syllables in back-to-back one letter words;
    In one embodiment, the disclosed system can be configured to ignore syllables from groups of words that resemble the dictation of a unique sequence, such as an ID or credit card number. If the system encounters back-to-back words each of length 1, then it can be instructed or configured to ignore these in the syllable count that is part of the process flow;
For each word in the defined time interval, count or otherwise determine a number of syllables spoken over the selected channel (as suggested by step or stage 108);
Compare the number of syllables spoken over the selected channel during the defined time interval to a threshold value (as suggested by step or stage 110);
  Where in one embodiment, the threshold value may be determined by analysis of the aggregate past behavior of the relevant channel. Typically (although it is not required for all use cases), the disclosed system or process does not update the threshold or the time interval based on the current conversation or communication session;
    If such prior behavior is not known, then the disclosed system or process may set an initial or default value and modify it as more calk are analyzed, using a process such as that described previously herein;
  As described, with prior knowledge of the IVR system a call will be associated with, it is possible to use a ruleset or table to configure the time interval and threshold value. A reason for this is that some IVR systems may require or cause longer responses than others. However, even IVR systems that involve longer responses are still expected to contain language patterns shorter than a natural conversation between two people;
  Some IVR systems may require those interacting with it to respond with a relatively long identifier or credit card number. In these systems it may be beneficial to ignore the syllables in back-to-back one letter words. As described, the disclosed system can be configured to ignore/filter syllables from groups of words that resemble the dictation of a unique sequence, such as an ID or credit card number;
Determine if the number of syllables spoken during the defined time interval exceeds the threshold value (as suggested by step or stage 112);
  the number of syllables spoken during the defined time interval does not exceed the threshold value (corresponding to the "No" branch of step or stage 112), then go to step or stage 104 (Determine a timestamp for the first detected word spoken in the channel) above and continue the processing;

Repeat (if necessary) until the number of syllables spoken during a defined time interval exceeds the threshold value;

if the number of syllables spoken during the defined time interval exceeds the threshold value (corresponding to the "Yes" branch of step or stage 112), then determine that the on-hold period has ended (as suggested by step or stage 114);

After determining that on-hold period or state has ended, continue or return to the process interrupted by the placement of the channel into the on-hold state (as suggested by step or stage 116). Examples of such interrupted processes may include, but are not limited to;

Conference Call;

Lecture; or

IVR Navigation and Response processing.

As mentioned, the time interval over which the disclosed processing occurs is set by an interval length. In one embodiment, the threshold value and time interval length may be calculated using a trial-and-error approach. In this approach, one would mark the location of an end to an on-hold period predicted by the system and evaluate if it was correct. When a misclassification is found, it may be evaluated, and the interval and/or threshold adjusted and retested. During a retest, other location predictions are not altered. This approach was found to be correct and reliable in a relatively high percentage of cases (approximately 94/100 recordings that were evaluated).

Although in one embodiment, the threshold or interval values are not updated or revised during a specific call, a more sophisticated approach to calculating these values may be developed and used for calls the disclosed system encounters. For example, by analyzing a subset of phrases (i.e., time intervals and the accompanying words) at the end of the on-hold period, the system can calculate an average phrase length.

These phrases can then be found manually from a representative sample. Once these phrases are found, the system can calculate statistics regarding the length of each phrase and the number of syllables in each phrase. These values can be compared to the average phrase length and syllable count in the phrases preceding the end of the on-hold period. This information can be used to develop a data driven calculation for the threshold value and phrase length interval. Furthermore, this data can be separated or categorized using prior information about the IVR system that was interacted with. As mentioned, in the context of the use cases being considered for most embodiments, these parameters are linked to one another, and are not independent.

Another approach that may be considered is to hand label the end of the on-hold period in a set of transcriptions of calls. One could then execute the disclosed process flow for each call and assign a point for a correct detection and subtract a point for an incorrect detection. This would be followed by using a global maximization algorithm to programmatically test multiple values for interval length and threshold until the "best" or optimal pair of values is determined. Further, it may be possible to create a learning scheme or more complex approach that can detect the end of an on-hold period. This would include a time interval and threshold as a single component or feature alongside others, such as parts of speech, for example.

Figure 2:
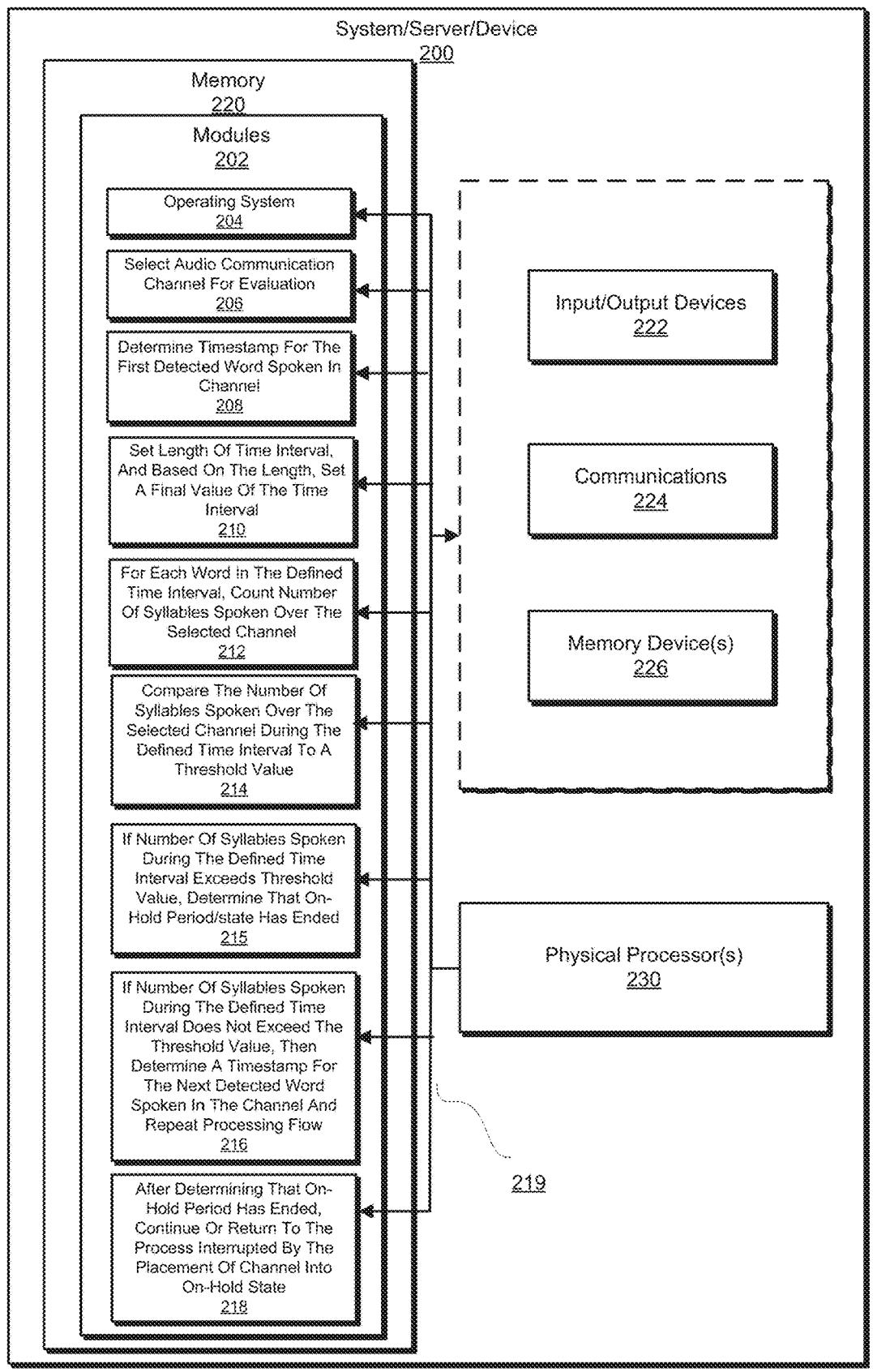
FIG. 2 is a diagram illustrating elements or components that may be present in a computing device or system configured to implement a method, process, function, or operation in accordance with an embodiment of the system and methods disclosed herein.

FIG. 2 is a diagram illustrating elements or components that may be present in a computing device, server, or system 200 configured to implement a method, process, function, or operation in accordance with some embodiments. As noted, in some embodiments, the disclosed system and methods may be implemented in the form of an apparatus that includes a processing element and set of executable instructions. The executable instructions may be part of a software application and arranged into a software architecture.

In general, an embodiment of the invention may be implemented using a set of software instructions that are designed to be executed by a suitably programmed processing element (such as a GPU, TPU, CPU, microprocessor, processor, controller, or computing device, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include any suitable computer-executable code or set of instructions e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As shown in FIG. 2, system 200 may represent a server or other form of computing or data processing device. Modules 202 each contain a set of executable instructions, where when the set of instructions is executed by a suitable electronic processor (such as that indicated in the figure by "Physical Processor(s) 230"), system (or server or device) 200 operates to perform a specific process, operation, function, or method.

Modules 202 may contain one or more sets of instructions for performing a method or function disclosed and/or described with reference to the Figures, and the descriptions of the functions and operations provided herein. These modules may include those illustrated but may also include a greater number or fewer number than those illustrated. Further, the modules and the set of computer-executable instructions that are contained in the modules may be executed (in whole or in part) by the same processor or by more than a single processor.

Modules 202 are stored in a memory 220, which typically includes an Operating System module 204 that contains instructions used (among other functions) to access and control the execution of the instructions contained in other modules. The modules 202 in memory 220 are accessed for purposes of transferring data and executing instructions by use of a "bus" or communications line 219, which also serves to permit processor(s) 230 to communicate with the modules for purposes of accessing and executing a set of instructions. Bus or communications line 219 also permits processor(s) 230 to interact with other elements of system 200, such as input or output devices 222, communications elements 224 for exchanging data and information with devices external to system 200, and additional memory devices 226.

Each application module or sub-module may correspond to a specific function, method, process, or operation that is implemented by the module or sub-module. Each module or sub-module may contain a set of computer-executable instructions that when executed by one or more programmed processors or co-processors cause the processors or co-processors (or a device or devices in which they are contained) to perform the specific function, method, process, or operation. Such function, method, process, or operation may include those used to implement one or more aspects of the disclosed system and methods, such as for:

Selection of an audio communication channel for evaluation (as suggested by module 206);

Determining a timestamp for the first detected word spoken in the channel (as suggested by module 208);

Set or select a length of a time interval, and based on the length, set a final value of the time interval (as suggested by module 210);

For each word in the defined time interval, count a number of syllables spoken over the selected channel (as suggested by module 212);

Compare the number of syllables spoken over the selected channel during the defined time interval to a threshold value (as suggested by module 214);

If the number of syllables spoken during the defined time interval exceeds the threshold value, then determine/decide that an on-hold period/state has ended (as suggested by module 215);

If the number of syllables spoken during the defined time interval does not exceed the threshold value, then Go to the step or stage "Determine a timestamp for the first detected word spoken in the channel" above and continue by detecting a next word (as suggested by module 216);

Repeat until the number of syllables spoken during a defined time interval exceeds the threshold value (as suggested by module 216); and After determining that on-hold period or state has ended, continue or return to the process interrupted by the placement of the channel into the on-hold state (as suggested by module 218).

As mentioned, each module may contain instructions which when executed by a programmed processor cause an apparatus (such as a server or client device) to perform the specific function or functions. The apparatus may be one or both of a client device or a remote server or platform. Therefore, a module may contain instructions that are performed (in whole or in part) by the client device, the server or platform, or both.

As mentioned, in some embodiments, the systems and methods described herein may be provided (in whole or in part) through a SaaS or multi-tenant platform. The platform provides access to multiple entities, each with a separate account and associated data storage. Each account may correspond to a communication session, a user, a set of users, or an organization, for example. Each account may access one or more services, a set of which are instantiated in their account, and which implement one or more of the methods or functions disclosed and/or described herein.

Figure 3:
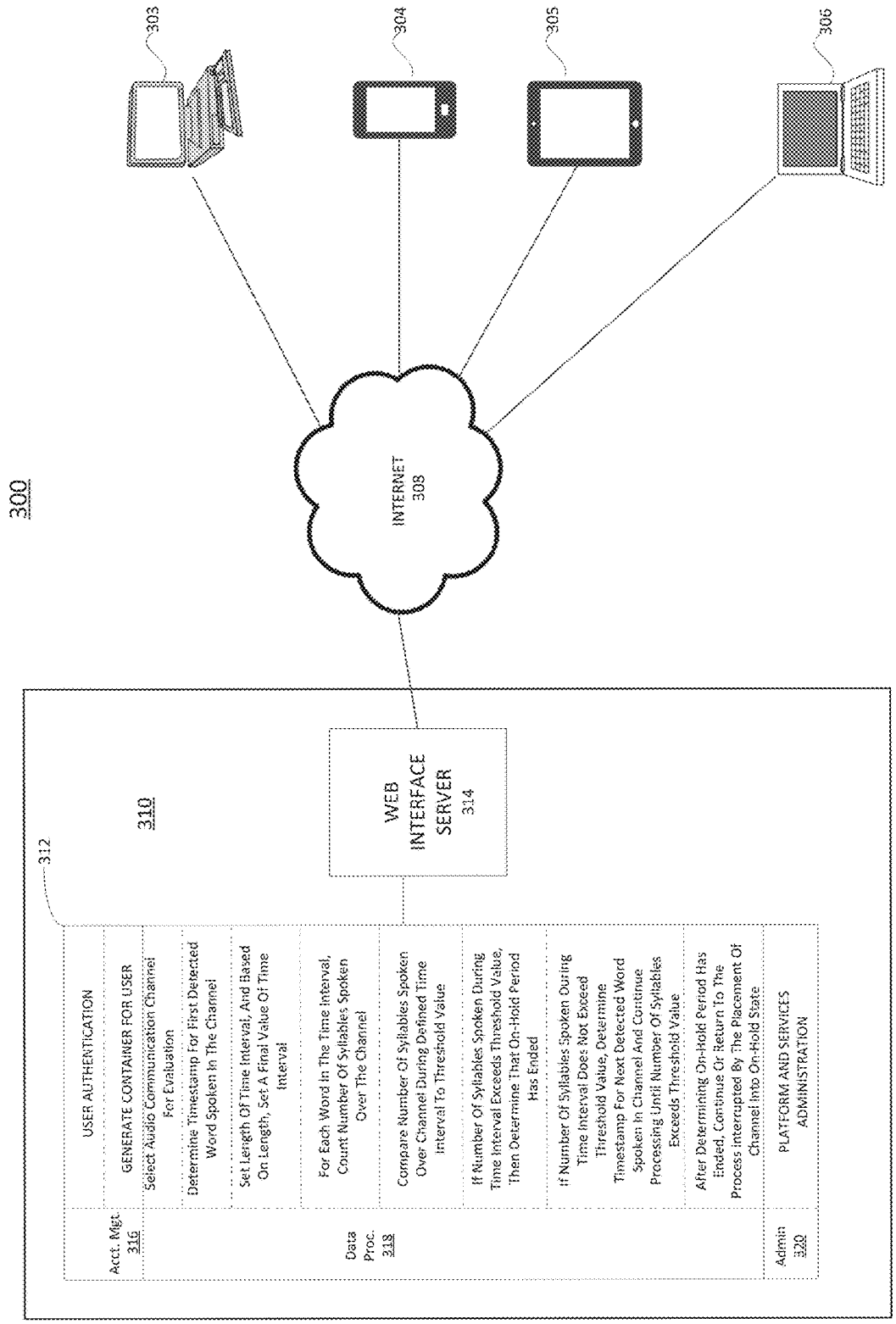
FIGS. 3-5 are diagrams illustrating a deployment of the disclosed system and methods as a service or application provided through a Software-as-a-Service platform, in accordance with some embodiments.
Figure 4:
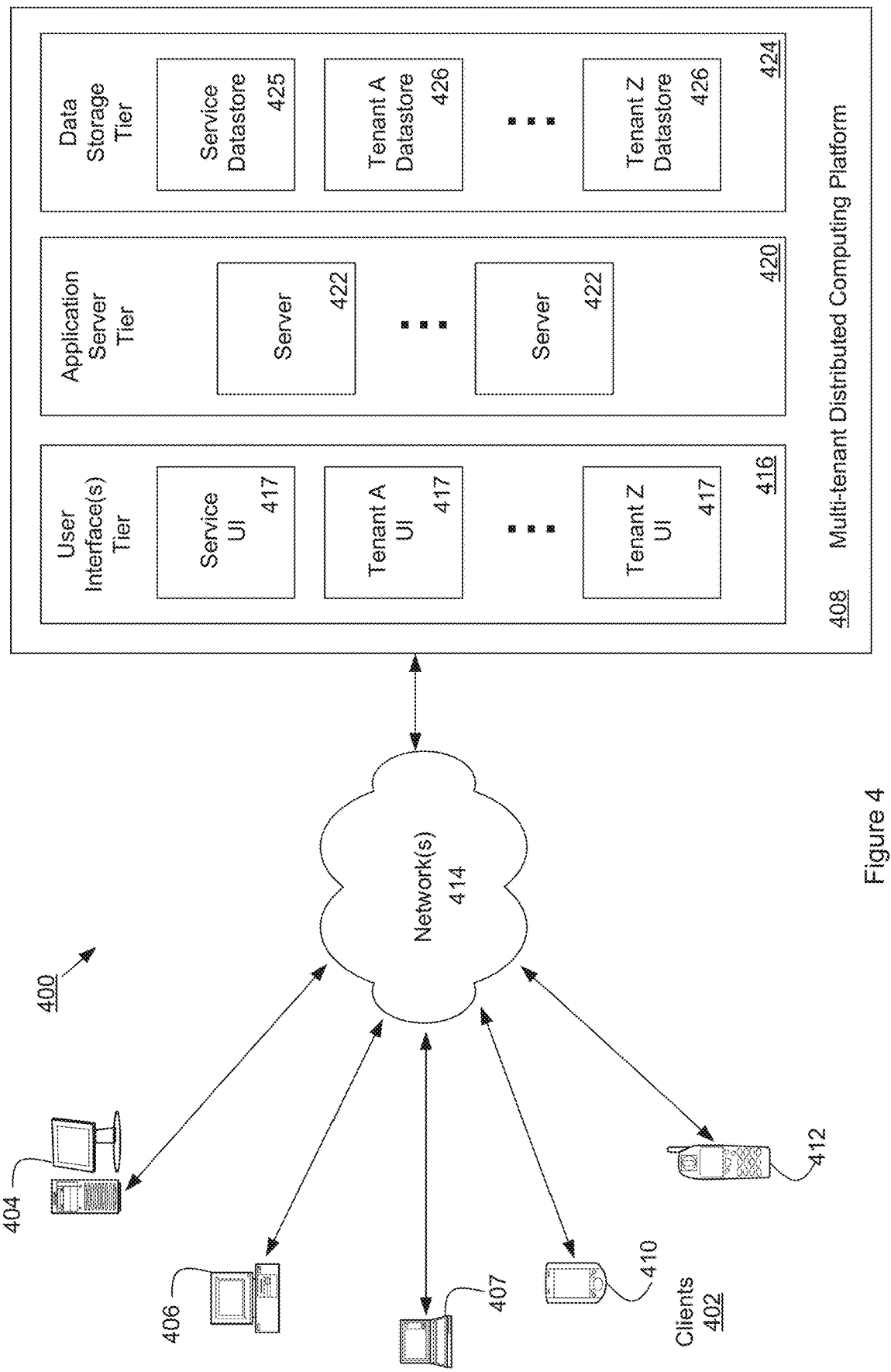
Figure 5:
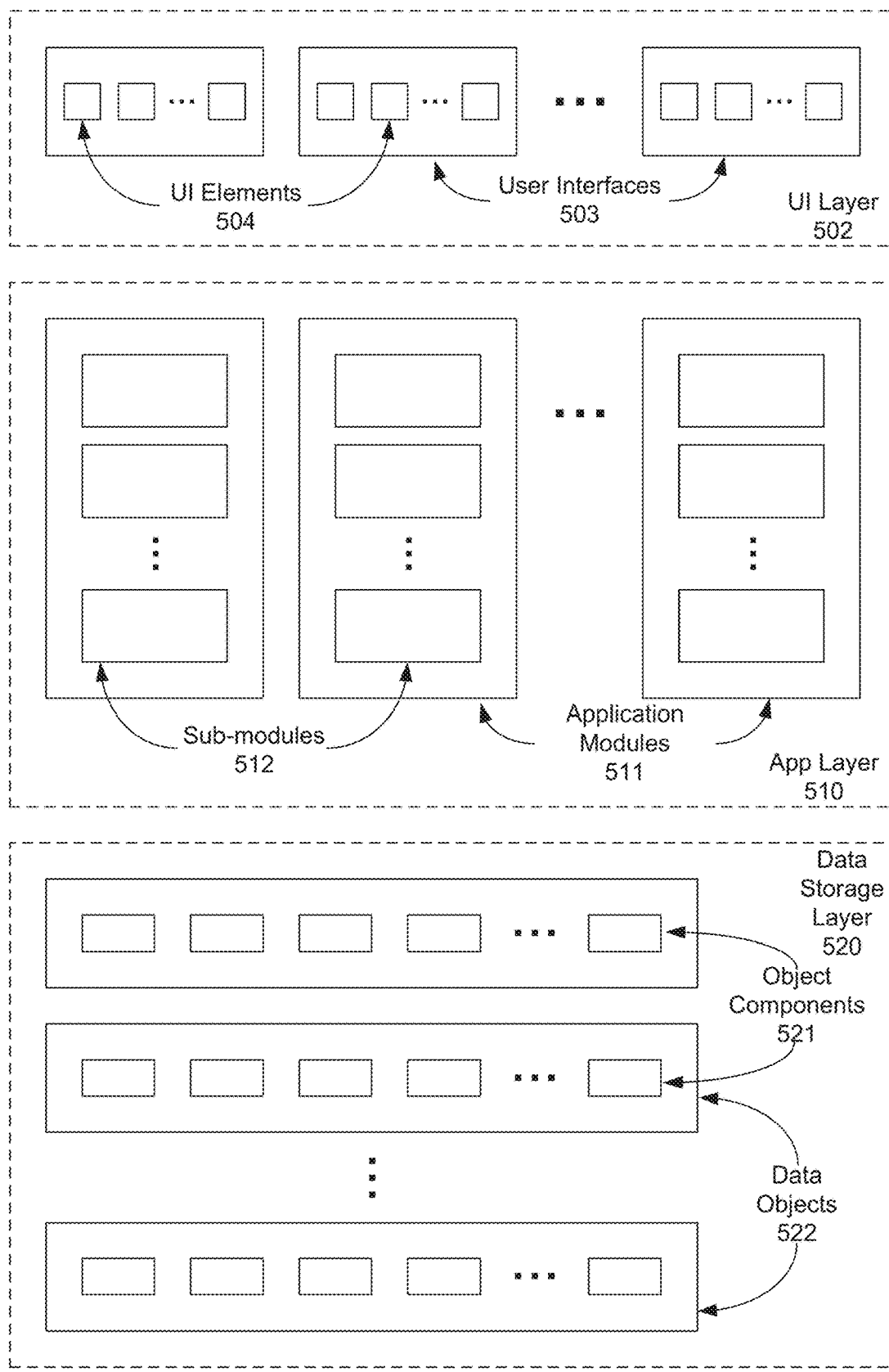

In some embodiments, the functionality and services provided by the system and methods disclosed and/or described herein may be made available to multiple users by accessing an account maintained by a server or service platform. Such a server or service platform may be termed a form of Software-as-a-Service (SaaS). FIG. 3 is a diagram illustrating a SaaS system in which an embodiment of the disclosure may be implemented. FIG. 4 is a diagram illustrating elements or components of an example operating environment in which an embodiment of the disclosure may be implemented. FIG. 5 is a diagram illustrating additional details of the elements or components of the multi-tenant distributed computing service platform of FIG. 4, in which an embodiment of the disclosure may be implemented.

In some embodiments, the system or service(s) disclosed and/or described herein may be implemented as microservices, processes, workflows, or functions performed in response to a user request. The micro-services, processes, workflows, or functions may be performed by a server, data processing element, platform, or system. In some embodiments, the services may be provided by a service platform located "in the cloud". In such embodiments, the platform is accessible through APIs and SDKs. The disclosed and/or described data processing and services may be provided as micro-services within the platform for each of multiple users or companies. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 3-5 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the call data processing and evaluation methodology disclosed and/or described herein.

Although in some embodiments, a platform or system of the type illustrated in FIGS. 3-5 may be operated by a $3^{rd}$ party provider to provide a specific set of business-related applications, in other embodiments, the platform may be operated by a provider and a different business may provide the applications or services for users through the platform. For example, some of the functions and services described with reference to FIGS. 3-5 may be provided by a $3^{rd}$ party with the provider of the trained models maintaining an account on the platform for each company or business using a trained model to provide services to that company's customers.

FIG. 3 is a diagram illustrating a system 300 in which an embodiment of the disclosure may be implemented or through which an embodiment of the services disclosed and/or described herein may be accessed. In accordance with the advantages of an application service provider (ASP) hosted business service system (such as a multi-tenant data processing platform), users of the services may comprise individuals, businesses, stores, or organizations, as non-limiting examples. A user may access the services using a suitable client, including but not limited to desktop computers, laptop computers, tablet computers, scanners, or smartphones. In general, a client device having access to the Internet may be used to access the disclosed and/or described services. Users interface with the service platform across the Internet 308 or another suitable communications network or combination of networks. Examples of suitable client devices include desktop computers 303, smartphones 304, tablet computers 305, or laptop computers 306.

System 310, which may be hosted by a third party, may include a set of services 312 and a web interface server 314, coupled as shown in FIG. 3. It is to be appreciated that either or both services 312 and the web interface server 314 may be implemented on one or more different hardware systems and components, even though represented as singular units in FIG. 3. Services 312 may include one or more functions or operations for the development and implementation of a set of operations to enable the disclosed and/or described data processing flow.

In some embodiments, the set of services or applications available to a company or user may include one or more that perform the functions and methods disclosed and/or described herein or with reference to the enclosed figures. As examples, in some embodiments, the set of applications, functions, operations or services made available through the platform or system 310 may include:

account management services 316, such as
- a process or service to authenticate a person wishing to access the services/applications available through the platform (such as credentials or proof of purchase, verification that the customer has been authorized by a company to use the services, etc.);
- a process or service to generate a container or instantiation of the services, methodology, applications, functions, and operations disclosed and/or described, where the instantiation may be customized for a particular user or company; and
- other forms of account management services;

a set 318 of data processing services, applications, or functionality, such as a process or service for one or more of:
- Selection of an audio communication channel for evaluation;
- Determining a timestamp for the first detected word spoken in the channel;
- Determining, setting or selecting a length of the time interval, and based on the length, setting a final value of the time interval;
- For each word in the defined time interval, counting a number of syllables spoken over the selected channel;
- Comparing the number of syllables spoken over the selected channel during the defined time interval to a threshold value;
- If the number of syllables spoken during the defined time interval exceeds the threshold value, then determining/deciding that an on-hold period/state has ended;
- If the number of syllables spoken during the defined time interval does not exceed the threshold value, then
  - Going to the step or stage "Determining a timestamp for the first detected word spoken in the channel" above and continue processing by detecting a next word; and
  - Repeating until the number of syllables spoken during a defined time interval exceeds the threshold value;
- After determining that an on-hold period or state has ended, continuing or returning to the process interrupted by the placement of the channel into the on-hold state; and administrative services 320, such as:
- a process or services to enable the provider of the data processing services and/or the platform to administer and configure the processes and services provided to users.

The platform or system shown in FIG. 3 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server. A web server is a most often a combination of hardware and the software that helps deliver content, commonly by hosting a website, to client web browsers that access the web server via the Internet.

FIG. 4 is a diagram illustrating elements or components of an example operating environment 400 in which an embodiment of the disclosure may be implemented. As shown, a variety of clients 402 incorporating and/or incorporated into a variety of computing devices may communicate with a multi-tenant service platform 408 through one or more networks 414. For example, a client may incorporate and/or be incorporated into a client application (e.g., software) implemented at least in part by one or more of the computing devices. Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components (such as one or more electronic processors, microprocessors, central processing units (CPU), or controllers). Examples of suitable networks 414 include networks utilizing wired and/or wireless communication technologies and networks operating in accordance with a suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as non-limiting examples. Each application server or processing tier 422 shown in the figure may be implemented with a set of computers and/or components including computer servers and processors, and may perform various functions, methods, processes, or operations as determined by the execution of a software application or set of instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of data or information. Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically Multiple, "servers."

As mentioned, rather than build and maintain such a platform or system themselves, a business may utilize systems provided by a third party. A third party may implement a business system/platform in the context of a mufti-tenant platform, where individual instantiations of a business' data processing workflow (such as the data processing and call management services disclosed and/or described herein) are provided to users, with each company/business representing a tenant of the platform. One advantage of such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 5 is a diagram illustrating additional details of the elements or components of the multi-tenant distributed computing service platform of FIG. 4, in which an embodiment of the disclosure may be implemented. In general, an embodiment may be implemented using a set of software instructions that are designed to be executed by a suitably programmed processing element (such as a CPU, microprocessor, processor, controller, or computing device, as non-limiting examples), In a complex system such instructions are typically arranged into "modules" with each such module performing a specific task, process, function, or operation. The entire set of modules may be controlled or coordinated in their operation by an operating system (OS) or other form of organizational platform.

As noted, FIG. 5 is a diagram illustrating additional details of the elements or components 500 of a multi-tenant distributed computing service platform, in which an embodiment may be implemented. The example architecture includes a user interface layer or tier 502 having one or more user interfaces 503. Examples of such user interfaces include graphical user interfaces and application programming interfaces (APIs). Each user interface may include one or more interface elements 504, For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, or messaging protocols.

The application layer 510 may include one or more application modules 511, each having one or more sub-modules 512. Each application module 511 or sub-module 512 may correspond to a function, method, process, or operation that is implemented by the module or sub-module (e.g., a function or process related to providing business related data processing and services to a user of the platform). Such function, method, process, or operation may include those used to implement one or more aspects of the disclosed and/or described system and methods, such as for one or more of the processes, methods, operations, services, or functions disclosed and/or described with reference to the Figures:

Selection of an audio communication channel for evaluation;

Determining a timestamp for the first detected word spoken in the channel;

Determining, setting or selecting a length of the time interval, and based on the length, setting a final value of the time interval;

For each word in the defined time interval, counting a number of syllables spoken over the selected channel;

Comparing the number of syllables spoken over the selected channel during the defined time interval to a threshold value;

If the number of syllables spoken during the defined time interval exceeds the threshold value, then determining/deciding that an on-hold period/state has ended;

If the number of syllables spoken during the defined time interval does not exceed the threshold value, then Going to the step or stage "Determining a timestamp for the first detected word spoken in the channel" above and continue processing by detecting a next word; and Repeating until the number of syllables spoken during a defined time interval exceeds the threshold value;

After determining that an on-hold period or state has ended, continuing or returning to the process interrupted by the placement of the channel into the on-hold state.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 422 of FIG. 4) may include each application module. Alternatively, different application servers may include different sets of application modules. Such sets may be disjoint or overlapping.

The data storage layer 520 may include one or more data objects 522 each having one or more data object components 521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 3-5 are not intended to be limiting examples. Further environments in which an embodiment may be implemented in whole or in part include devices (including mobile devices), software applications, systems, apparatuses, networks, SaaS platforms, IaaS (infrastructure-as-a- service) platforms, or other configurable components that may be used by multiple users for data entry, data processing, application execution, or data review.

In some embodiments, the systems and methods disclosed and/or described herein may be used to enable the categorization of a set of calls based on hold time. There are several reasons why this may be beneficial:

Consider a situation where time of day calling was associated with hold time—in that setting one could more accurately understand what times of day or days themselves are more indicative of a higher hold time. This would be a foundational piece to some form of "smart" call routing in order to rout a call to the "best" location to handle an incoming call at the most optimal time;

a. Another area of benefit concerns when a service representative or other person should place/initiate a "next" call. For example, in a scenario where a human is on the phone and they estimate the call will end in 10 mins, such a model could say these are the estimated hold times for these 5 use case calls. Using that information, a user could make an informed decision about when to make their next call while still on the current call, as a function of call type. This could be even more intelligent by considering call type; or A typical scenario is that the hold time for different goals may differ (e.g., to speak to a billing representative, customer/technical support, to check for prior authorizations, or for scheduling). We also may not have the data separated as it comes in (e.g., if one folder contains all calls irrespective of call type).

In the example implementation where a system understood that a hold time would likely be "x" minutes while the current call likely has "y" minutes left, the value of "x" could be made more specific based on a set of average hold times associated with call types. Refer to such a set as W={x,y,z,r,t} where each of x,y,z,r,t are the average hold time for a call type denoted by x,y,z,r,t. In this scenario, a call center employee could more confidently understand that there are "y" minutes left in a call and based on that, decide which call type should be placed next.

With regards to the categorization of a set of calls based on statistical analysis of hold times and/or other characteristics, although NLU (Natural Language Understanding) can be used to better classify calls, the circumstances of a call may impact hold times. Such circumstances may include one or more of:

Time of day;
Region;
Call type;
Time of the month (end of a quarter may be higher); or
Who is being called (their role or other characteristic).

Processing an audio call to identify one or more of a set of "keywords" that suggest the intent of a call may be beneficial by providing information to help in partitioning or validating a statistical analysis. NLU (Natural Language Understanding), more specifically an intent classification model may be used to classify specific intents or phrases. For example, "How are you doing today" may be associated with the intention of inquiring how someone is at the time. There are multiple approaches to document classification in the areas of Natural Language Processing (NLP), Natural Language Understanding, Machine Learning, and General Artificial Intelligence, and one or more may be used to validate the statistical analysis and partitioning results disclosed and/or described herein.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data, Each element (or instances or example, in the form of one or more parameters, variables, characteristics or "features") of the set of training data is associated with a label or annotation that defines how the element should be classified by the trained model. A machine learning model in the form of a neural network is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or any other form of decision or classification process may be used to implement one or more of the methods, functions, processes, or operations disclosed herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" (nodes) that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as Python, Java, JavaScript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Fila-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed, No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the disclosure is not limited to the embodiments described above or depicted in the drawings, and various embodiments and modifications may be made without departing from the scope of the claims below.

What is claimed is:

1. A method of operating a call center, comprising:
for each of a plurality of calls received at a call center,
performing the operations of receiving the call at the call center on a communication channel;
determining that the communication channel has been placed into an on-hold state;
operating a processor to
determine a timestamp for the first detected word spoken in the communication channel;
setting the determined timestamp as the initial value of a time interval;
setting a length of the time interval;
based on the length of the time interval, set a final value of the time interval;
for each word in the time interval, determine a number of syllables spoken over the communication channel;
compare the determined number of syllables spoken over the communication selected-channel during the time interval to a threshold value;
if the determined number of syllables spoken during the time interval exceeds the threshold value, then determining that the on-hold state has ended;
in response to determining that the on-hold state has ended, storing a record of the time the call was received at the call center and the length of the on-hold state of the call;
assembling a dataset including the time each of the plurality of calls was received at the call center and the length of the on-hold state associated with each of the plurality of calls; and
processing the dataset to determine a desirable level of staffing at the call center to reduce the length of on-hold states for received calls, or a preferred time to place or receive a call at the call center to reduce the length of an on-hold state for the placed or received call.

2. The method of claim 1, wherein one or more of the length of the time interval or the threshold value are determined by one or more of historical data regarding the channel, a rule, a heuristic, or a trained model.

3. The method of claim 1, wherein one or more of the length of the time interval or the threshold value are determined by a type of interactive voice response (IVR) system that a user is interacting with.

4. The method of claim 1, wherein the process interrupted by placement of the communication channel into the on-hold state is one or more of a conference call, a lecture, or the navigation and response processing of an IVR system.

5. The method of claim 1, further comprising processing the audio in the communication channel using an automatic speech recognition process prior to counting the number of syllables in each word spoken over the selected channel during the time interval.

6. The method of claim 5, further comprising removing one or more single syllable words prior to counting the number of syllables in each word spoken over the communication selected-channel during the time interval.

7. The method of claim 1, wherein if the number of syllables spoken during the time interval does not exceed the threshold value, then the method comprises:
determining a timestamp for the first detected word spoken in the communication channel after the time interval;
repeating the steps of the method until the number of syllables spoken during a subsequent time interval exceeds the threshold value; and
after determining that the on-hold state has ended, returning to a process interrupted by placement of the communication channel into the on-hold state.

8. The method of claim 1, further comprising:
based on the length of the on-hold time state for each of the plurality of received calls, determining a distribution of the length of the on-hold time period;
based on the distribution of the length of the on-hold time period, determining a range of on-hold time periods expected to contain non-human speech; and
routing a received call in an on-hold state to an appropriate call center representative or process after expiration of a time period equal to the range of on-hold time periods expected to contain non-human speech.

9. A system, comprising:
one or more electronic processors configured to execute a set of computer-executable instructions; and
the set of computer-executable instructions, wherein when executed, the instructions cause the one or more electronic processors to, for each of a plurality of calls received at a call center
receive the call at the call center on a communication channel;
determine that the communication channel has been placed into an on-hold state;
determine a timestamp for the first detected word spoken in the communication channel;
set the timestamp as the initial value of a time interval;
set a length of the time interval;
based on the length, set a final value of the time interval;
for each word in the time interval, count a number of syllables spoken over the communication channel;
compare the number of syllables spoken over the communication channel during the time interval to a threshold value;
if the number of syllables spoken during the time interval exceeds the threshold value, then determine that an on-hold state has ended;
in response to determining that the on-hold state has ended, store a record of the time the call was received at the call center and the length of the on-hold state of the call;
assemble a dataset including the time each of the plurality of calls was received at the call center and the length of the on-hold state associated with each of the plurality of calls; and
process the dataset to determine a desirable level of staffing at the call center to reduce the length of on-hold states for received calls, or a preferred time to place or receive a call at the call center to reduce the length of an on-hold state for the placed or received call.

10. The system of claim 9, wherein one or more of the length of the time interval or the threshold value are determined by one or more of historical data regarding the channel, a rule, a heuristic, or a trained model.

11. The system of claim 9, wherein one or more of the length of the time interval or the threshold value are determined by a type of interactive voice response (IVR) system that a user is interacting with.

12. The system of claim 9, wherein the process interrupted by placement of the channel into the on-hold state is one or more of a conference call, a lecture, or the navigation and response processing of an IVR system.

13. The system of claim 9, wherein the instructions further cause the one or more electronic processors to process the audio in the communication channel using an automatic speech recognition process prior to counting the number of syllables in each word spoken over the selected channel during the time interval.

14. The system of claim 13, wherein the instructions further cause the one or more electronic processors to remove one or more single syllable words prior to counting the number of syllables in each word spoken over the communication channel during the time interval.

15. One or more non-transitory computer-readable media including a set of computer-executable instructions that when executed by one or more electronic processors, cause the electronic processors to, for each of a plurality of calls received at a call center:
- receive the call at the call center on a communication channel;
- determine that the communication channel has been placed into an on-hold state;
- determine a timestamp for the first detected word spoken in the communication channel;
- set the timestamp as the initial value of a time interval;
- set a length of the time interval;
- based on the length, set a final value of the time interval;
- for each word in the time interval, count a number of syllables spoken over the communication channel;
- compare the number of syllables spoken over the communication channel during the time interval to a threshold value;
- if the number of syllables spoken during the time interval exceeds the threshold value, then determine that an on-hold state has ended;
- in response to determining that the on-hold state has ended, store a record of the time the call was received at the call center and the length of the on-hold state of the call;
- assemble a dataset including the time each of the plurality of calls was received at the call center and the length of the on-hold state associated with each of the plurality of calls; and
- process the dataset to determine a desirable level of staffing at the call center to reduce the length of on-hold states for received calls, or a preferred time to place or receive a call at the call center to reduce the length of an on-hold state for the placed or received call.

16. The one or more non-transitory computer-readable media of claim 15, wherein one or more of the length of the time interval or the threshold value are determined by one or more of historical data regarding the channel, a rule, a heuristic, or a trained model.

17. The one or more non-transitory computer-readable media of claim 15, wherein one or more of the length of the time interval or the threshold value are determined by a type of interactive voice response (IVR) system that a user is interacting with.

18. The one or more non-transitory computer-readable media of claim 13, wherein the process interrupted by placement of the channel into the on-hold state is one or more of a conference call, a lecture, or the navigation and response processing of an IVR system.

19. The one or more non-transitory computer-readable media of claim 15, wherein the instructions further cause the one or more electronic processors to process the audio in the communication channel using an automatic speech recognition process prior to counting the number of syllables in each word spoken over the selected-channel during the time interval.

20. The one or more non-transitory computer-readable media of claim 19, wherein the instructions further cause the one or more electronic processors to remove one or more single syllable words prior to counting the number of syllables in each word spoken over the communication channel during the time interval.

* * * * *